United States Patent
Piirainen et al.

(10) Patent No.: US 6,425,105 B1
(45) Date of Patent: Jul. 23, 2002

(54) BIDIRECTIONAL ARQ APPARATUS AND METHOD

(75) Inventors: Olli Piirainen; Arto Savuoja, both of Oulu (FI)

(73) Assignee: Nokia Networks Oy, Nokia Group (FI)

( * ) Notice: Subject to any disclaimer, the term of this patent is extended or adjusted under 35 U.S.C. 154(b) by 0 days.

(21) Appl. No.: 09/550,676

(22) Filed: Apr. 17, 2000

Related U.S. Application Data

(63) Continuation of application No. PCT/EP98/05412, filed on Aug. 26, 1998.

(51) Int. Cl.[7] .............................. H04L 1/02; H04L 1/16
(52) U.S. Cl. ............................. 714/748; 714/751
(58) Field of Search ..................... 714/748, 774, 714/751

(56) References Cited

U.S. PATENT DOCUMENTS

| | | | |
|---|---|---|---|
| 5,084,877 A | | 1/1992 | Netravali et al. ............... 371/32 |
| 5,551,068 A | * | 8/1996 | Goldsmith et al. ............ 455/89 |
| 5,706,428 A | * | 1/1998 | Boer et al. .................. 395/200 |
| 5,918,174 A | * | 6/1999 | Chennakeshu et al. ..... 455/427 |
| 5,933,763 A | * | 8/1999 | Wang et al. ................ 455/31.3 |
| 6,046,990 A | * | 4/2000 | Chennakeshu et al. ..... 370/317 |
| 6,154,489 A | * | 11/2000 | Kleider et al. .............. 375/221 |

FOREIGN PATENT DOCUMENTS

| | | |
|---|---|---|
| JP | 3-19441 | 1/1991 |
| JP | 03019441 | 1/1991 |

* cited by examiner

*Primary Examiner*—Stephen M. Baker
(74) *Attorney, Agent, or Firm*—Altera Law Group, LLC

(57) ABSTRACT

An error control apparatus and method is disclosed, wherein a control message is used to request a retransmission of a received erroneous digital signal transmitted in a first direction via a transmission medium. The control message is transmitted in a second direction of said transmission medium, wherein the transmission rate of the control method is controlled in dependence on a usage of the transmission medium in the second direction and/or an amount of available memory in a receiving means (5) for receiving said digital signal. Thereby, the overall data throughput in the first and second direction can be optimized by changing the rate of the control message.

9 Claims, 2 Drawing Sheets

BIDIRECTIONAL ARQ APPARATUS AND METHOD

Figure 1:
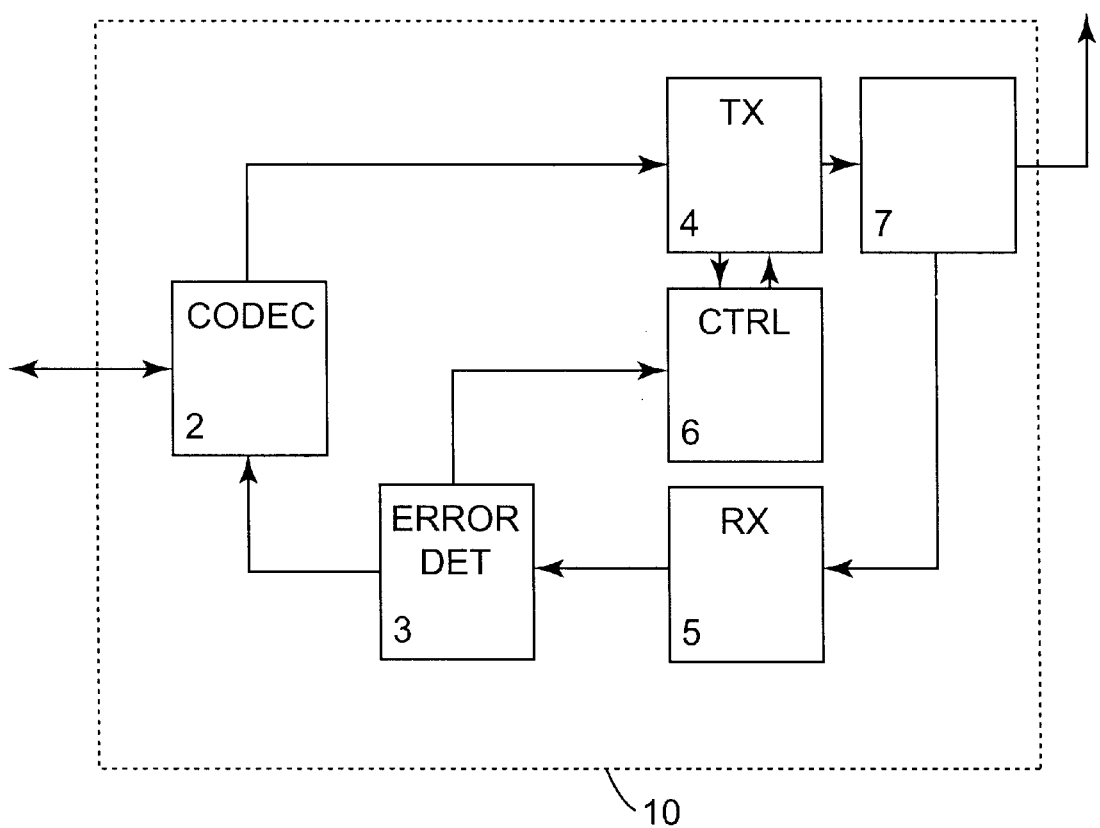

This application is a continuation of International application No. PCT/EP98/05412 filed Aug. 26, 1998.

FIELD OF THE INVENTION

The present invention relates to an error control apparatus and method for a digital transmission system such as a General Packet Radio Services system (GPRS) having a transmission medium for performing transmission in a first and a second direction.

BACKGROUND OF THE INVENTION

In a digital transmission system, transmission errors occur due to noise and distortion. There are two types of transmission errors: random errors and burst errors. Random errors may be caused by thermal noise. Burst errors are generated during a fade in the transmission channel.

Transmission errors can be detected by adding a redundant signal (check bits) to the information signal. Upon detecting a transmission error, there are two ways to control the error. One is called ARQ (Automatic Repeat Request) and uses a feedback control to request a retransmission of the corrupted data. The other, called FEC (Feed-Forward Error Correction), uses a feed-forward control to control the errors.

A system employing an ARQ scheme requests a retransmission of the data received in error. There are three ARQ strategies: (i) Stop-and-Wait (ii) Go-Back-N, and (iii) Selective Repeat.

In the Stop-and-Wait ARQ system, the receiver sends an ACK signal to acknowledge a correct reception, and sends a NAK signal to request a retransmission of a coded signal block detected in error. However, the efficiency of transmission is low, since a confirmation of the received signal is made for every block of data.

In the Go-Back-N ARQ system, a coded data block is transmitted continuously. If the transmitter receives a NAK signal requesting a retransmission then the transmitter goes back by N data blocks and restarts the transmission from that data block. The time delay between the transmission of a data block and the reception of a NAK signal must be less than the time for the transmission of N data blocks. The idle time is shorter for this system than for the Stop-and-Wait ARQ system. However, it still wastes time, since N data blocks, which may include blocks with error, are transmitted for every retransmission.

In the Selective Repeat ARQ system, data blocks are sent continuously and only the blocks in error are retransmitted. Thus, this system has the highest efficiency. The management of the order of data blocks and the buffer is more complicated for this system compared to the other systems.

Moreover, a method is known where an erroneous block is stored and used as a diversity when retransmission occurs. However, a memory is required for the erroneous blocks.

There are other techniques, known as hybrid ARQ systems, wherein a combination of an ARQ scheme and a forward error correction is used. In this context a type II hybrid ARQ is known, wherein a data block is transmitted at first in a heavily punctured way, and in case of required retransmissions, the punctured bits are transmitted. This results in a good performance in one direction of transmission, but requires quite a lot acknowledge messaging in the other direction, reducing the possible data rate in that direction.

Accordingly, a problem arises in that inoptimization of the data transfer rate in one direction, for example a downlink direction, requires a lot ACK/NAK messaging in the other direction, i.e. the uplink direction. This leads to a reduction of the possible data rate available in the uplink direction to the same or other users.

SUMMARY OF THE INVENTION

It is an object of the present invention to provide an error control apparatus and method by means of which the overall data throughput in both transmission directions can be optimized.

This object is achieved by an error control apparatus for a digital transmission system having a transmission medium for performing a transmission in a fist and a second direction, comprising:
 error detection means for detecting an error in a digital signal transmitted in said first direction via said transmission medium;
 transmitting means for transmitting a control message in said second direction via said transmission medium so as to request a retransmission of said digital signal, if said error detection means detects an error in said digital signal; and
 control means for controlling a transmission rate of said control message in dependence on an usage of said transmission medium in said second direction and/or an amount of available memory in a receiving means for receiving said digital signal.

Furthermore, the above object is achieved by an error control method for a transmission system having a transmission medium for performing transmission in a first and a second direction, comprising the steps of:
 detecting an error in a digital signal transmitted in said first direction via said transmission medium;
 transmitting a control message in said second direction. via said transmission medium so as to request a retransmission of said digital signal if an error has been detected in said error detection step; and
 controlling a transmission rate of said control message in dependence on a usage of said transmission medium in said second direction and/or an amount of available memory in a receiving means for receiving said digital signal.

According to the invention, the network capacity can be optimized by controlling the transmission rate of the control message so as to achieve high throughput rates. As an example, the throughput in one direction can be increased by allowing more messaging, i.e. a higher control message rate, in the other direction, if the usage of the other direction is low. When there is a data transmission in both directions, the overall data throughput can be optimized by changing the rate of the control messages in accordance with the usage of the respective transmission directions.

Alternatively or additionally, the transmission rate of the control message can be controlled on the basis of the available memory in the receiver, such that a lower transmission-rate can be used if a larger memory for error processing is available in the receiver.

In case of a diversity ARQ method, an erroneous portion of the digital signal can be stored in a storing means and can be used for the diversity processing after the retransmission has been performed. Thereby, a transmission method with a higher bit rate can be used due to the improved error correction efficiency, so as to increase the throughput rate.

In the above case, the control means can be arranged to adjust the transmission rate in accordance with an available amount of memory in said storing means. Thus, a loss of erroneous signal portions required for the diversity processing can be prevented.

Preferably, the control means can be arranged to reduce the transmission rate and to select another coding scheme which leads to a smaller amount of errors, when a signal transmission is performed in the second transmission direction.

Accordingly, the overall throughput can be optimized by reducing the transmission rate of the control message and selecting a better coding scheme leading to a smaller amount of errors.

Figure 2:
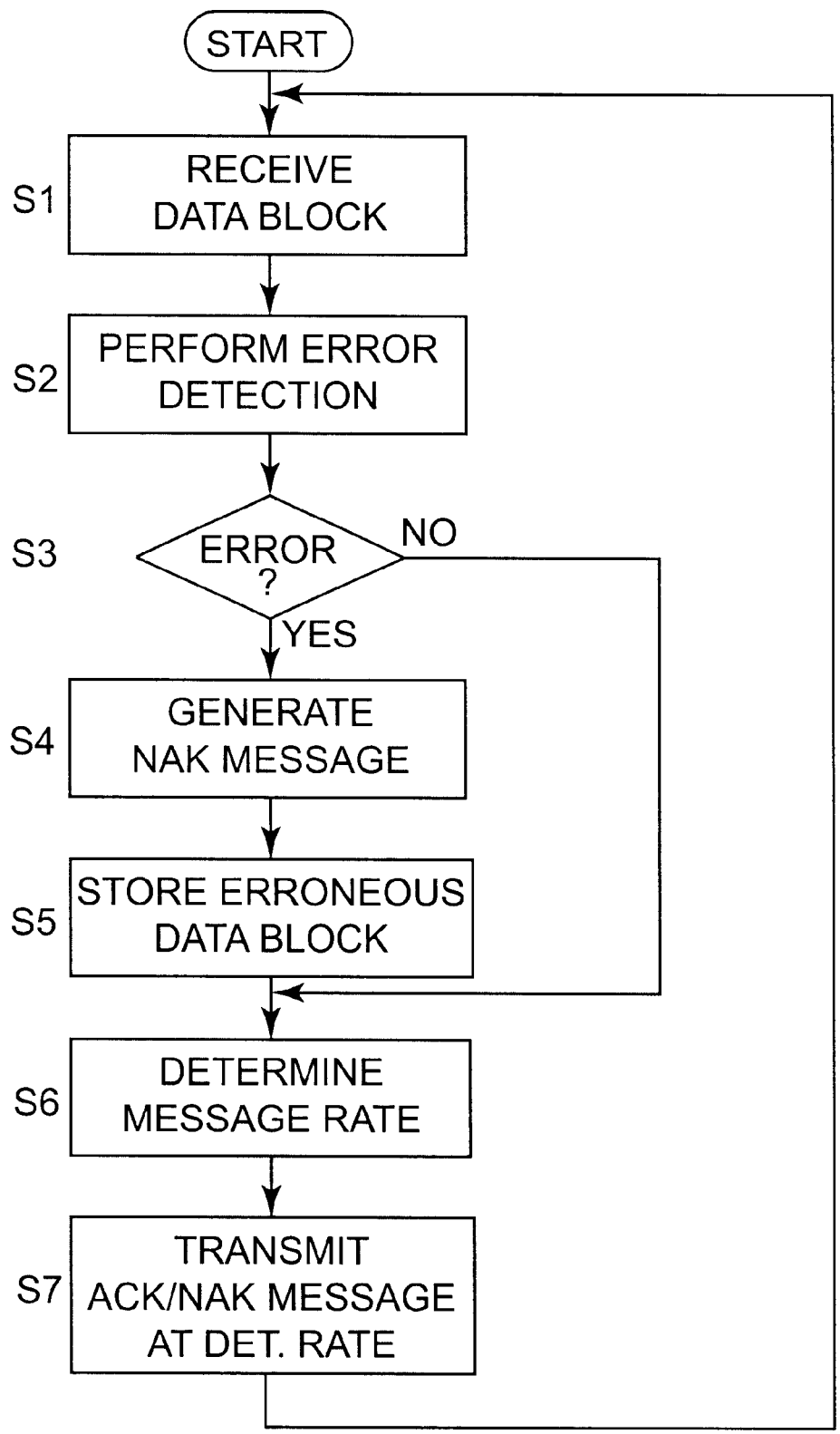

In the following, the invention will be described in greater detail on the basis of a preferred embodiment with respect to the accompanying drawings, wherein FIG. 1 shows a principle block diagram of an error control apparatus according to the preferred embodiment of the present invention; and FIG. 2 shows a flow diagram of an error control method according to the preferred embodiment of the present invention.

DESCRIPTION OF THE PREFERRED EMBODIMENT

A principle block diagram of a preferred embodiment of the present invention is shown in FIG. 1, wherein an adaptive ARQ error control method for a GPRS system is performed in a base station 10 of a GSM network.

According to FIG. 1, the base station 10 comprises a combining means 7 which is arranged to supply an uplink signal received via an uplink radio channel and an antenna from a mobile station to a receiver 5, and to supply a downlink signal generated in a transmitter 4 to the antenna in order to be transmitted via a downlink radio channel to a respective mobile station.

Furthermore, an error detector 3 is provided for detecting an error according to a known error detection method, as described above. The error detector 3 is connected to a control means 6 such as a CPU or the like, so as to supply a signal indicating the occurrence of an error to the control means 6. The control means 6 is connected to the transmitter 4 so as to detect a usage or throughput of the transmission direction and to supply an ACK message or a NAK message to the transmitter 4, which message is to be transmitted in accordance with the detection result of the error detector 3 according to the known ARQ error control scheme.

Additionally, a codec 2 is provided in the base station 10, which performs signal coding and decoding according to a line transmission channel connected to other network elements of the GSM network.

According to the preferred embodiment, error correction is performed according to the type II hybrid ARQ scheme or the ARQ error control scheme. As already mentioned, in the ARQ error control scheme, previous data blocks received from the receiver 5 are used as a diversity. From these systems, the hybrid ARQ scheme provides the best performance in one direction, but requires more ACK/NAK messages in the other direction. The repetition with diversity ARQ method exhibits the best performance, when coding schemes with high error rates and high throughputs are used for data transmission. However, this also increases the amount of retransmissions. Since, according to this method, an erroneous block must be stored until it has been correctly received, a lot of memory is required if slow acknowledge rates are used. Thus, also in this case, the performance of the system (with finite amount of memory) is improved if the acknowledge rate is increased, or, otherwise, the memory requirement could be reduced.

According to the present embodiment, the acknowledge rate is changed according to the usage of the data transmission in the other direction. In case of a repetition with diversity ARQ method, the message rate can be adjusted according to the available amount of memory in the mobile station or the base station.

FIG. 2 shows a block diagram of the basic processing steps of the error control method performed in the preferred embodiment shown in FIG. 1.

When a data block has been received by the receiver 5 in step S1, the received data block is supplied to the error detector 3 so as to perform an error detection processing (step S2). In case an error has been detected in the received data block in step S3; the error detector 3 supplies a corresponding signal to the control means 6 which subsequently generates a NAK message (step S4) to be transmitted in order to request a retransmission of the erroneous data block.

Thereafter, the erroneous data block is stored in a memory provided in the base station 10 (step S5). It is to be noted, that step 5 is only required if the repetition with diversity ARQ method is performed.

In case no error has been detected in the received data block, steps 4 and 5 are not performed, i.e. skipped.

Subsequently, the control means 6 detects the usage or data throughput in the downlink direction by referring to the transmitter 4 and determines a message rate for the acknowledge message, i.e. the ACK or NAK message, in accordance with the detected usage or throughput (step S6).

Subsequently, an ACK message is transmitted at the determined message rate, if no error has been detected, and a NAK message is transmitted at the determined message rate, if an error has been detected by the error detector 3, as indicated in step S7.

The above processing is repeatedly performed as long as data blocks are received.

It is to be noted that the same method and corresponding means may also be provided in the mobile station of the GSM system.

In case a repetition with diversity ARQ method is used and data is transmitted in the downlink direction, the throughput rate can be increased if a coding scheme with a high bit rate is chosen (highly punctured), which leads to a big amount of erroneous or missed blocks. However, the higher bit rate compensates this loss and leads to an improvement. This has been verified by EDGE (Enhanced Data rates for GSM Evolution) simulations performed by the inventor. Of course, this gain can only be achieved if the erroneous block is stored in order to be used in a diversity processing.

As the amount of memory available in a mobile station is limited, the acknowledgement messages have to be transmitted at a sufficiently high rate, such that the memory capacity is sufficient for the number of erroneous blocks. Accordingly, the determination in step S6 may additionally or alternatively be performed in dependence on the amount of memory available in the mobile station to thereby optimize the overall data throughput.

Furthermore, the downlink throughput can be further improved, if the above mentioned type II hybrid ARQ error control scheme is employed, which, however, increases the amount of acknowledgement messages even more. Moreover, if a transmission is also performed in the uplink direction, the acknowledgement messages reduce the possible data rate in the uplink direction. In this case, an optimum throughput can be achieved by reducing the message rate and selecting another coding scheme which leads to a smaller amount of a erroneous blocks and also decreases the memory requirement in the mobile station. Thereby, the need for high, data rates in the downlink and uplink transmission should be taken into account when designing the acknowledgement rates.

It should be understood that the above description and the accompanying figures are only intended to illustrate the present invention. Thus, the error control apparatus and method according to the present invention may also be used in other network elements and other digital transmission systems. Moreover, the present invention may vary within the scope of the attached claims.

An error control apparatus and method is disclosed, wherein a control message is used to request a retransmission of a received erroneous digital signal transmitted in a first direction via a transmission medium. The control message is transmitted in a second direction of said transmission medium, wherein the transmission rate of the control message is controlled in dependence on a usage of the transmission medium in the second direction and/or an amount of available memory in a receiving means for receiving said digital signal. Thereby, the overall data throughput in the first and second directions can be optimized by changing the rate of the control message.

What is claimed is:

1. An error control apparatus for a digital transmission system having a transmission medium for performing transmission in a first and a second direction comprising:
   a) error detection means (3) for detecting an error in a digital signal transmitted in said first direction via said transmission medium, wherein an erroneous portion of said digital signal is stored in a storing means and used for diversity processing after retransmission has been performed;
   b) transmitting means (4) for transmitting a control message in said second direction via said transmission medium so as to request a retransmission of said digital signal, if said error detection means (3) detects an error in said digital signal; and
   c) control means (6) for controlling a transmission rate of said control message in dependence on at least one of a usage of said transmission medium in said second direction and an amount of available memory in a receiving means (5) for receiving said digital signal, wherein said control means (6) is arranged to adjust said transmission rate in accordance with an available amount of memory in said storing means.

2. An error control apparatus according to claim 1, wherein said control means (6) is arranged to reduce said transmission rate and to select another coding scheme which leads to a smaller amount of errors, when a signal transmission is performed in the second transmission direction.

3. An error control apparatus according to claim 1 wherein said transmission system is a GPRS system.

4. An error control apparatus according to claim 1, wherein said control message is a NAK message of an ARQ error correction scheme.

5. An error control apparatus according to claim 4, wherein said first direction is an uplink direction and said second direction is a downlink direction.

6. An error control method for a transmission system having a transmission medium for performing transmission in a first and a second direction, comprising the steps of:
   a) detecting an error in a digital signal transmitted in said first direction via said transmission medium, wherein an erroneous portion of said digital signal is stored in a storing means and used for diversity processing after retransmission has been. performed;
   b) transmitting a control message in said second direction via said transmission medium so as to request a retransmission of said digital signal if an error has been detected in said error detecting step; and
   c) controlling a transmission rate of said control message in dependence on at least one of a usage of said transmission medium in said second direction and an amount of available memory in a receiving means for receiving said digital signal, wherein controlling said transmission rate is in accordance with an available amount of memory in said storing means.

7. An error control method according to claim 6, wherein said transmission rate is changed in dependence on a data throughput of said second direction.

8. An error control method according to claim 6, wherein said digital signal is coded according a coding scheme with a high bit rate.

9. An error control method according to claim 6, further comprising the step of selecting another coding scheme for transmitting the digital signal, when a transmission is performed in the second direction, said other coding scheme leading to a smaller amount of erroneous blocks.

* * * * *